United States Patent [19]

Ballmer

[11] Patent Number: 4,529,275

[45] Date of Patent: *Jul. 16, 1985

[54] CONTINUOUS CHARGE CONTROL FOR ELECTROCHROMIC LAYERS

[75] Inventor: Horst Ballmer, Heidenheim, Fed. Rep. of Germany

[73] Assignee: Carl-Zeiss-Stiftung, Heidenheim, Fed. Rep. of Germany

[*] Notice: The portion of the term of this patent subsequent to Apr. 23, 2002 has been disclaimed.

[21] Appl. No.: 436,172

[22] Filed: Oct. 22, 1982

[30] Foreign Application Priority Data

Oct. 29, 1981 [DE] Fed. Rep. of Germany ....... 3142909

[51] Int. Cl.³ ................................................. G02F 1/03
[52] U.S. Cl. ........................................................ 350/357
[58] Field of Search ......................................... 350/357

[56] References Cited

U.S. PATENT DOCUMENTS 3,630,603 12/1971 Letter .................................. 350/357
4,228,431 10/1980 Barclay et al. ...................... 350/357

Primary Examiner—Bruce Y. Arnold
Attorney, Agent, or Firm—Hopgood, Calimafde, Kalil, Blaustein & Judlowe

[57] ABSTRACT

A continuous change in color is provided in order to control the absorptance of an electrochromic layer. The quantities of charge to be fed and removed by two sources of constant current are measured with a forward/backward counter. For decoloring processes, smaller amounts of charge are removed from the layer than are supplied to it for corresponding coloring processes. The quantities of charge removal for decoloring processes are, however, slightly greater than the quantities of charge which are theoretically necessary to obtain intermediate values with exactly the same absorptance, thereby assuring against destruction of the layer, even in case of numerous changes between different colorings. Preferred fields of use are lenses, particularly eyeglass lenses, filters and dimmable mirrors, using an applied electrochromic layer whose absorptance is varied.

20 Claims, 5 Drawing Figures

CONTINUOUS CHARGE CONTROL FOR ELECTROCHROMIC LAYERS

BACKGROUND OF THE INVENTION

The present invention relates to a method and apparatus for controlling the absorptance of an electrochromic layer.

Electrochromic layers become dark (colored) in the presence of an applied voltage or when a charge is supplied, i.e., their absorptance increases. Upon the removal of charges, the layers become transparent (decolored) again.

It is known to make use of this phenomenon for display elements, in which case only the transparent and the colored states are used. In this connection, for the coloring process a defined current is fed for a defined period of time. Too great a supply of charges must be avoided, to avoid destruction of the electrochromic layer. On the other hand, the decoloring process is not critical, since it is not possible to remove from the layer more charges than are present in it, and the completely charge-free layer is also the layer with the lowest absorptance. One substantial advantage of electrochromic layers is that they consume current only during a change in their absorptance.

For display elements, two states of the electrochromic layer are sufficient. For other purposes of use, such as sunglasses, optical filters and dimmable mirrors, however, intermediate values are advantageous or necessary. If identical charge and discharge times with identical charge and discharge currents (i.e., identical supply and removal of charges) are used for shifting between such intermediate values, then the layer becomes brighter and brighter (progressively more transparent), since a greater increment of charge is required to effect a given increment in the coloring of an electrochromic layer than is the charge decrement (charge removal) required for the corresponding decrement of coloring (decoloring).

BRIEF STATEMENT OF THE INVENTION

The object of the present invention is to provide a method and an arrangement applicable to electrochromic layers for enabling establishment of intermediate absorptance values, and to reproducibly achieve this result for conditions of repeated change between intermediate values, while also assuring against such an excessive supply of charges as could destroy the layer.

The invention achieves this object by providing for continuous adjustability of the absorptance, by providing for removal of smaller amounts of charge for a given decoloring of the layer than are supplied for a corresponding coloring process, and by providing that the quantities of charge removal for the decoloring process are slightly greater than the quantities of charge which are required to obtain intermediate values with exactly the same absorptance.

One suitable embodiment of the invention is characterized by use of a control circuit to start and to stop the coloring and decoloring processes, and by using one constant-current source to supply charges to the electrochromic layer (coloring process) and another constant-current source to remove charges therefrom (decoloring process) under timed control while counting pulses are delivered by a clock via an up/down or forward/backward counter (with an associated clock-pulse generator), such that the reading of the counter quantitatively characterizes the colored state of the layer, and such that the counter disconnects the coloring or decoloring process via the control circuit when the completely colored or the completely decolored state is attained.

An advantageous embodiment is characterized by the fact that the electrochromic layer is connected to two sources of constant current via which charges are supplied and removed, that the switch inputs for the sources of constant current are connected to two outputs of a control circuit, that these outputs are furthermore connected to a clock generator, that the clock generator is connected to a forward/backward counter for delivery of counting pulses during a coloring or a decoloring process, that the two highest-order outputs of the forward/backward counter are connected to the control circuit, and that the frequency of the clock generator is greater when serving the decoloring process than when serving the coloring process.

In this connection, however, the clock frequency for the decoloring process is set slightly lower than theoretically necessary, so that the layer is always decolored more than it is colored. In this way, one avoids the possibility of the layer receiving too much charge and being thereby damaged, even in case of frequent change of intermediate values. The slightly excessive decoloring of the layer is compensated for upon each adjustment to the completely decolored state, since it is not possible to remove more than all the charges from the layer.

In another embodiment, the respective levels of charge and discharge current from the constant-current sources are adjusted to so differ from each other that, in the context of using the same clock frequency for both directions of counting, the different amounts of charge for corresponding changes in coloring and decoloring are practically balanced out. In this case, the discharge current is set slightly too large in order to definitely avoid damage to the layer by an excessive amount of charge, in the event of frequent changing of the intermediate values.

In both embodiments, it is advantageous to provide transistors as the sources of constant current, and to control them via base resistors in their emitter circuits.

Another advantageous feature of the invention consists in the use of several clock frequencies or charge currents for the coloring process.

Push-button keys or contact sensors can be provided for actuating the coloring or decoloring process. In one advantageous arrangement, the control circuit is so developed that touch keys or contact sensors are operative to start or stop the coloring and decoloring process.

In another advantageous embodiment of the invention, the provision of additional storage and comparator circuitry makes it possible to achieve an automatic stop for each coloring and/or decoloring process, and the stop is adjustable to any desired intermediate value.

And in a particularly advantageous embodiment, the intensity of radiation behind the electrochromic layer is measured by an optical sensor, and absorptance of the layer is automatically so controlled that the thus-measured radiation intensity lies within a predeterminable range.

DETAILED DESCRIPTION

The invention will be described in further detail in conjunction with the accompanying drawings, in which.

Figure 1:
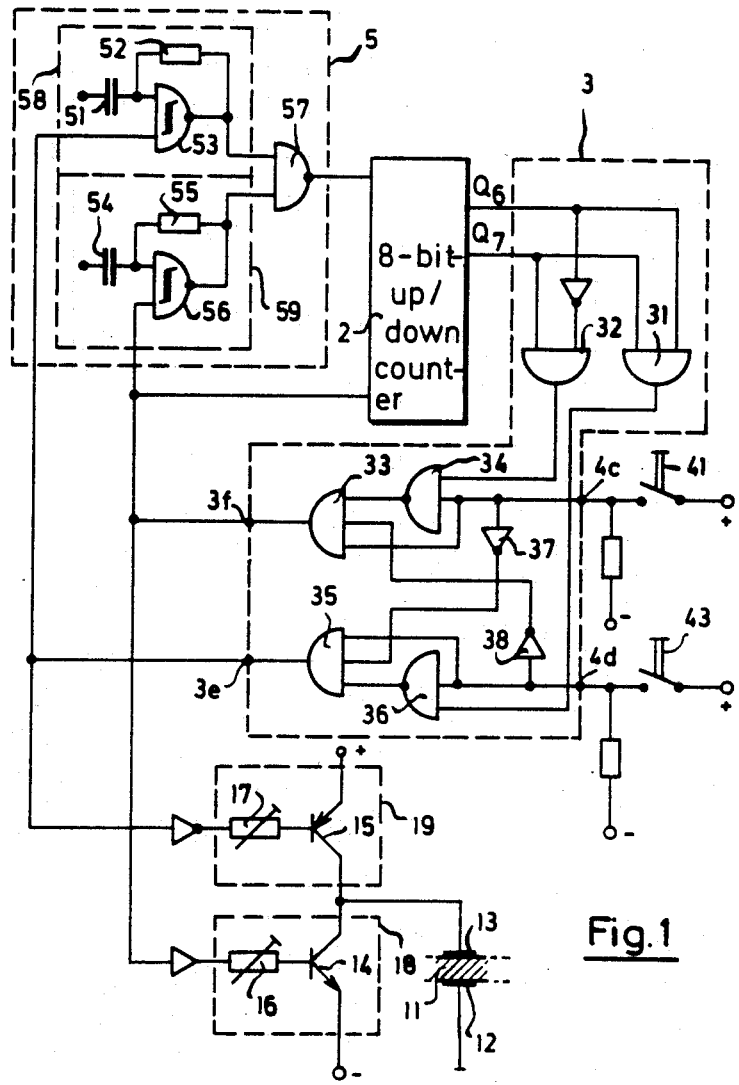
FIG. 1 is a diagram schematically illustrating circuitry for an embodiment in which single push-button keys are separately available for selective coloring and decoloring control.

In FIG. 1, 11 identifies an electrochromic layer between electrodes 12 and 13. Electrode 12 is at zero potential, and electrode 13 is connected to constant-current sources 18 and 19. The constant-current sources 18 and 19 consist of an NPN transistor 14 and a PNP transistor 15 whose emitters are respectively connected to the negative and positive poles of a voltage source and whose common junction point is connected to the electrochromic layer. Transistors 14 and 15 are controlled via the base resistors 16 and 17 whose value determines and limits the charge and discharge currents for layer 11, solely via current amplification of the transistors. During the coloring process, the NPN transistor 14 is conductive, and during the decoloring process, the PNP transistor 15 is conductive.

Coloring and decoloring currents for the electrochromic layer 11 are turned on and off by a circuit component 3 which is responsive both to operation by push-keys 41 and 43 and to the two highest-order outputs $Q_6$ and $Q_7$ of a counter 2.

The counter 2 is connected to a clock generator 5 in which the clock signal which forms the basis for charge control is produced by a first generator 59 for a coloring process and by a second generator 58 for a decoloring process.

After connection of the voltage supply (not shown), the counter 2 is first set (by known means not shown in the drawing)—with its highest-order output $Q_7$ at "1" or "H" and with all other outputs at "∅" or "L". This condition characterizes the completely colored state of the electrochromic layer; after connection of the voltage supply, this state is first of all assumed, so that the electrochromic layer—regardless of the condition in which it happens to be—will be completely decolored.

Thus, "1" is present at the output of an AND gate 32, and "∅" at the output of an AND gate 31. If the push-key 41 for coloring is now depressed, then both inputs of a NAND gate 34 are at "1", and the output of gate 34 is therefore at "∅". Thus, one of the inputs of an AND gate 33 is at "∅" and so also is its output. Depression of the push-key 41 for coloring remains without effect since the counter has the value for the completely colored layer and no further feeding of charge can take place.

If the push-key 43 for decoloring is depressed, then the respective inputs of a NAND gate 36 are at "∅" and "H", and the output is therefore at "1". Thus, all three inputs of and AND gate 35 are at "1" and so also is its output; as a result, the electrochromic layer begins the decoloring process, which continues as long as the operating key 43 is depressed. During the decoloring process, generator 58 is active. It comprises a capacitor 51, a resistor 52 and a Schmitt-trigger NAND gate 53, and it provides counting pulses to the forward/backward counter 2 via a NAND gate 57. The forward/backward counter 2 counts backward as long as the signal at the forward/backward counter input is not "H". The output of AND gate 31 remains at "∅" until the counter has a "∅" in all digit positions, and it then jumps to its next value, at which all digit positions are at "1". At this moment, depression of the operating key 43 becomes ineffective, because the layer has become completely decolored. This is also the state achieved upon first placing the circuit in operation (i.e., after connection of the voltage supply); the layer is completely decolored, even if it had been previously completely colored. In this state, the constant-current source 19 becomes passive and the clock generator 5 is stopped.

Although the counter-output condition at which all digit positions are at "1" represents the completely decolored state, this state is sufficiently characterized by the two highest-order outputs $Q_7$ and $Q_6$. Only in this state is the output of AND gate 31 at "1", so that actuation of the push-key 43 for decoloring is without effect.

However, if in this state, key 41 is depressed for coloring action, then the inputs of NAND gate 34 are at "∅" and "1", it being noted that the output of AND gate 32 is "∅". Thus, "1" appears at the output of NAND gate 34 and, accordingly, all three inputs of AND gate 33 are at "1" and so also is its output; as a result, the constant-current source 18 for coloring action becomes active, and generator 59 delivers counting pulses to counter 2 via AND gate 57. Since the forward/backward counter input is now also at "H", the counter counts forward. The output of AND gate 32 remains at "∅" until counter 2 is at "1" in all its output digit positions with the exception of the highest-order position; at the next pulse, counter 2 jumps to its next value, at which only the highest-order output digit position is at "1". At this moment, depression of push-key 41 becomes ineffective, because the layer has become completely colored; simultantously, the constant-current source 18 becomes passive, and clock generator 5 is stopped.

Although the counter-output condition at which only the highest-order position is "1" represents the completely colored state, this state is sufficiently characterized by the two highest-order outputs $Q_7$ and $Q_6$. Only in this state is the output of AND gate 32 at "1", so that actuation of the push-key 41 for coloring is ineffective.

In the control circuit 3, connections with inverters 37 and 38 assure that, at any given time, only one of the two push-keys 41 and 43 can be operative.

An important advantage of the described circuit is that the electrochromic layer can be set to as many color states as desired. In the example indicated, 128 intermediate states are available from use of an 8-bit counter (2) over the counting range which has been described. This number can, of course, be increased, using a counter with a greater bit capacity. For many uses, fewer intermediate states and thus fewer bits will also be sufficient. From each of the intermediate states, there is thus possible both a change in the coloring direction and a change in the decoloring direction.

Electrochromic layers have the property that more charges must be supplied in the coloring process than be removed in the decoloring process. In the arrangement of FIG. 1, this unequal charge balance is compensated by providing different clock frequencies in the circumstance of constant current for coloring equal to the constant current for decoloring. The clock frequency for the decoloring process is somewhat greater than the clock frequency for the coloring process, so that decoloring processes require somewhat more time than corresponding coloring processes. However, provision must be made to avoid progressive darkening in the event of frequent change between intermediate states; without such provision, progressive darkening could finally lead to destruction of the electrochromic layer. For this reason, the clock frequency for decoloring processes is, for reasons of safety, preset with a small conservative error, namely to a slightly lower frequency than needed to achieve a desired rate of decoloring, so that for a given count in the coloring direction followed by the same count in the decoloring direction, the progressive net change of transmittance will be in the decoloring direction, so that, for frequent changes between intermediate states, the layer will become somewhat too bright (decolored); it should be noted that even though the clock frequency for decoloring as thus set for a lower conservative value, the clock frequency for decoloring is nevertheless greater than the clock frequency for coloring. This small error, involving net progressive change in the decoloring direction, can be corrected by completely decoloring the layer, since it is not possible to remove more charges than are present at any given time.

A second embodiment of the invention provides improved reproducibility by using plural generators of different frequency for the coloring process. This approach recognizes the fact that, during the coloring process in an electrochromic layer, increases in absorptance do not proportionally follow increases in applied charge; they become less as the layer becomes increasingly colored. (On the other hand, in the decoloring process, there is linearity between the charge removed and the change in the absorptance.)

Figure 2:
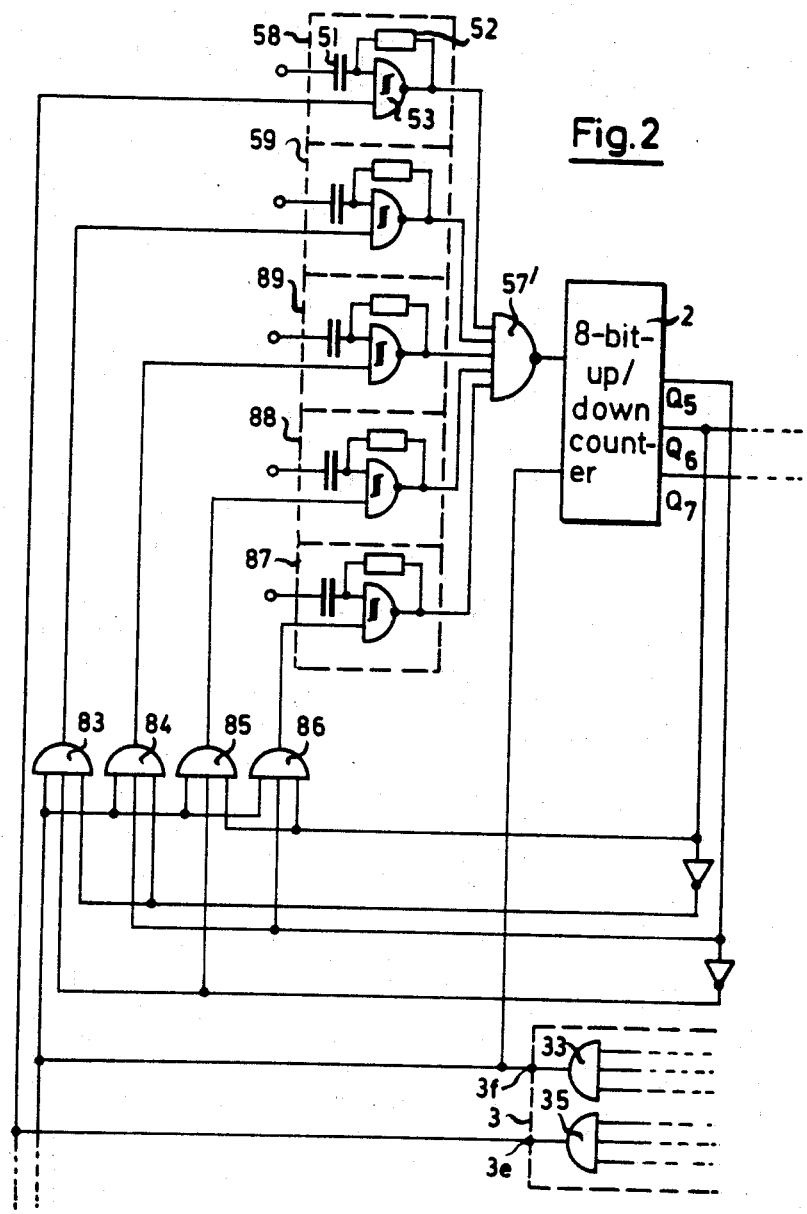
FIG. 2 is a similar diagram to show circuitry for substitution in a portion of FIG. 1 to provide several clock frequencies for the coloring process.

FIG. 2 shows this second embodiment with four different clock-pulse generators for the coloring process, designated 59 and 87 to 89. The selection of the generator active at any given time is effected via binary combination of the two highest-order counter (2) outputs $Q_6$ and $Q_5$ which change during the coloring process. The logic connection for signals necessary in such selection occurs via AND gates 83 to 86. If, for example, the electrochromic layer is completely decolored, then after the first counting pulse, "L" or "∅" is at both output $Q_6$ and output $Q_5$. Thus, at AND gate 83 all three inputs are at "H", and generator 59 becomes active. On the other hand, the central input of AND gate 84 is not "H", the right-hand input of AND gate 85 is not "H", and the central input of AND gate 86 is not "H", so that generators 87 to 89 are not activated. If at the end of the coloring process, $Q_6$ is at "H" and $Q_5$ is at "H", then all three inputs of AND gate 86 are at "H", and generator 87 becomes active. It will be seen that it is possible to use only two or, for example, eight clock-pulse generators of different frequency for the coloring process.

Figure 3:
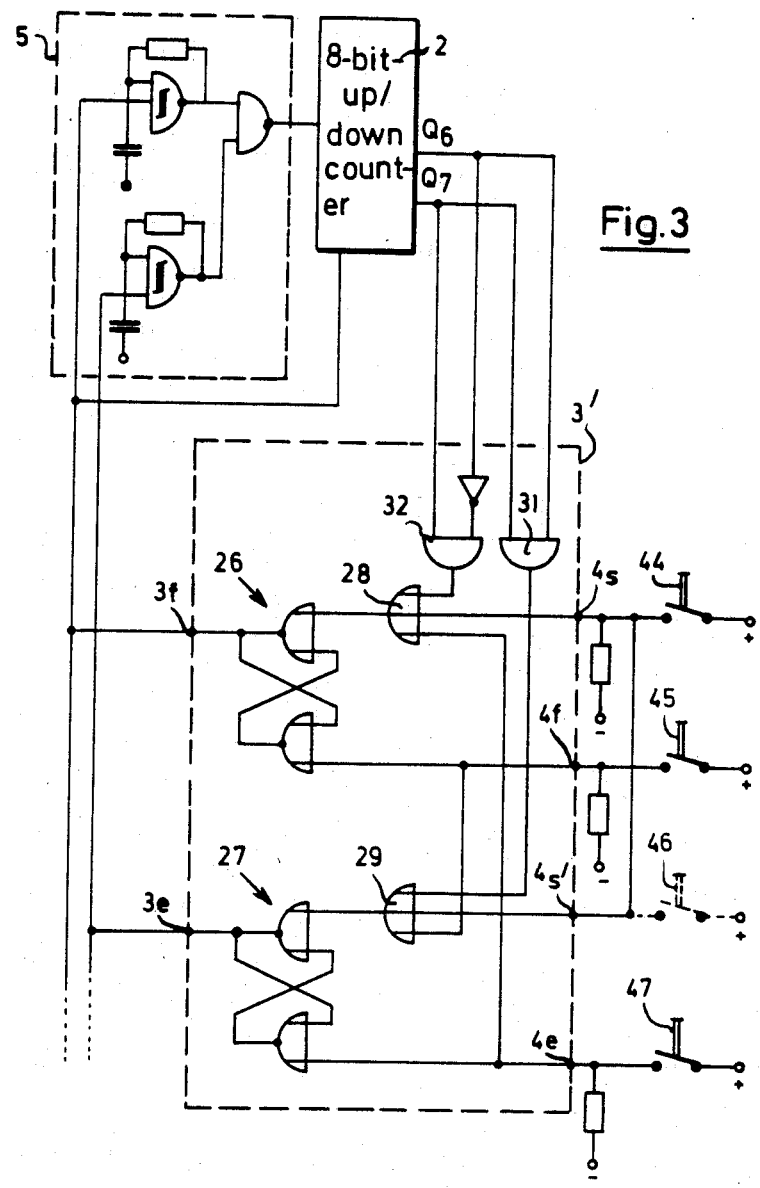
FIG. 3 is a circuit diagram to illustrate a modification in a portion of FIG. 1, whereby individual switches are instantaneously operative to start or to stop the coloring and the decoloring process, as selectively as desired.

FIG. 3 shows another embodiment of the invention in which the push-keys of FIG. 1, which must be kept depressed during the entirety of any given coloring or decoloring process, are replaced by touch-keys 44 to 47. In this embodiment, key 45, to initiate a coloring process, or key 47, to initiate a decoloring process, need be touched only briefly. The coloring or decoloring process then proceeds until either the completely colored or the completely decolored condition is reached, or until stop key 44 is touched.

Keys 44 to 47 control the coloring and decoloring processes via connections involving one or the other of flip-flops 26 and 27, each of which consists of two NOR gates. The output of the applicable flip-flop goes only to "H" and thus places the coloring or decoloring process in operation, depending upon which of the color-start decolor-start keys is depressed, and when all inputs of the preceding OR gates 28 and 29 are at "L". Thereafter, coloring or decoloring proceeds as described above, as permitted by the state of counter 2, and there is no further key operation. The flip-flops 26 and 27 are set back to "L", and thus the coloring or decoloring process is interrupted, when the layer either is completely colored or is completely decolored, at which point the output of the involved AND gate 32 or 31 goes to "H"; alternatively, a coloring (or a decoloring) process will be interrupted either by pressing the decoloring (or the coloring) key, or by pressing one of the stop keys 44 or 46. The second stop key 46 is provided for applications in which the start-coloring key 45 and the start-decoloring key 47 are spaced apart from each other, i.e., where a stop key is desirable for each start key. This can, for example, be true for sunglasses in which the start-coloring key may be at the far end of the left-temple piece, while the start-coloring key is at the far end of the right-temple piece, the keys being in the form of touch-contact sensors; in such an arrangement, it is advisable to provide a stop key in each temple piece, so that a given coloring (or decoloring) process may be started and stopped by the same hand.

Figure 4:
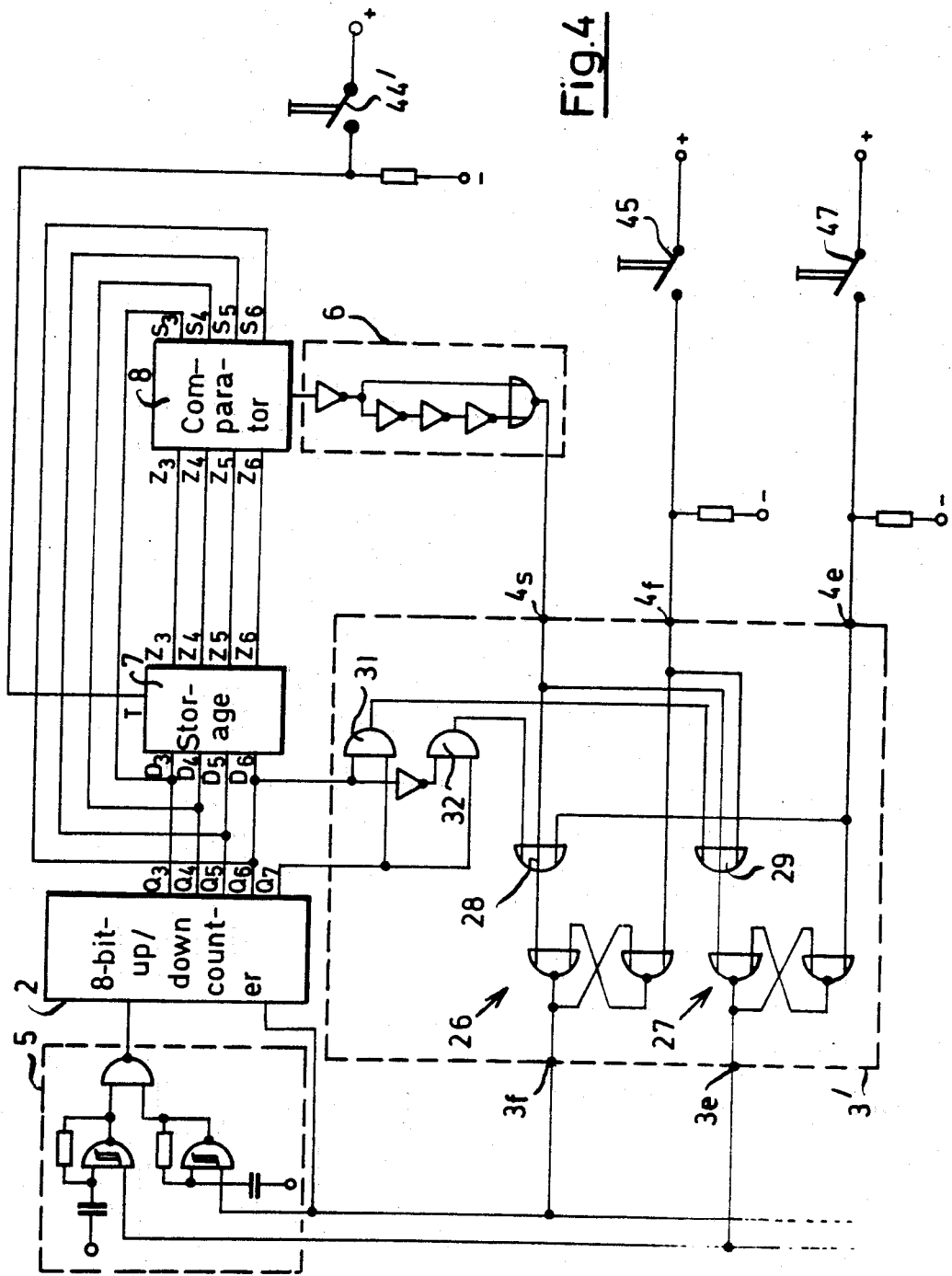
FIG. 4 is a diagram to show circuitry for substitution in a portion of FIG. 1 to provide for a programmable stop at any desired intermediate absorptance value.

As further development of the invention, FIG. 4 illustrates an arrangement in which any desired intermediate value can be programmed as a stop for the coloring or for the decoloring process. With this arrangement, four digit-position outputs $Q_3$, $Q_4$, $Q_5$ and $Q_6$ of counter 2 are connected to the four inputs $D_3$, $D_4$, $D_5$ and $D_6$ of a quadruple-D flip-flop 7 and at the same time to one side (marked S) of a four-bit comparator 8, while the four outputs $Z_3$, $Z_4$, $Z_5$ and $Z_6$ of the quadruple flip-flop 7 are correspondingly connected to the other size (marked Z) of the four-bit comparator 8. A stop key 44' is connected to the clock input T of the quadruple flip-flop 7. If the stop key 44' is actuated in a given state of the circuit, then the positive flank of the key (44') pulse at the clock input T of the quadruple flip-flop 7 causes the instantaneous states of the counter outputs ($Q_3$ to $Q_6$) to be stored and delivered to the four outputs $Z_3$ to $Z_6$ of the quadruple flip-flop. At this juncture, the same binary combination is present at both the Z input and the S input of comparator 8. The output (Z=S) of comparator 8 therefore becomes active, i.e., it assumes the state "H". A differentiating network 6, comprising a known network of inverters and a NOR gate, is connected to the output (Z=S) of comparator 8; network 6 detects the leading (positive-going) flank of the Z=S output pulse, and the output of network 6 is supplied as a short "H" pulse to OR gates 28 and 29. This "H" pulse to OR gates 28 and 29 is equivalent to a stop-key pulse, as explained in connection with FIG. 3, and it serves to terminate any coloring or decoloring process.

Since the state of the output side $Z_3$ to $Z_6$ of the quadruple flip-flop 7 is retained, the state $Z=S$ at the comparator 8 will occur once for each sweep of the coloring or decoloring process between the completely colored and the completely decolored conditions, the particular coloring or decoloring process being automatically stopped when the counter output is at the stored level. Once an intermediate value of the absorptance has been set, therefore, it will be always automatically produced by touching the applicable starting key. And if desired, the coloring or decoloring process can thereafter be caused to proceed beyond the automatic stop, by again actuating the applicable starting key. For the situation in which the starting key is actuated when the electrochromic layer is completely decolored or is completely colored, the programmed stop coincides practically with the final states of the layer, in which case it provides practically no additional effect. It coincides precisely with the final states when the flip-flop 7 and the comparator 8 are designed for six bits. It has been found in practice, however, that a four-bit capability is sufficient for most purposes, i.e., the programmable stop can assume 16 different values. It is also clear that the forward/backward counter can be designed for more than eight bits, but in this case also, experience shows that 128 intermediate states are fully sufficient for most uses, and that one thus has the availability of virtually continuous adjustment.

It it is desired that the programmable stop shall occur only for the coloring process or only for the decoloring process, it is merely necessary to connect the flank-differentiating network 6 to the comparator output for $Z<S$ or for $Z>S$.

Figure 5:
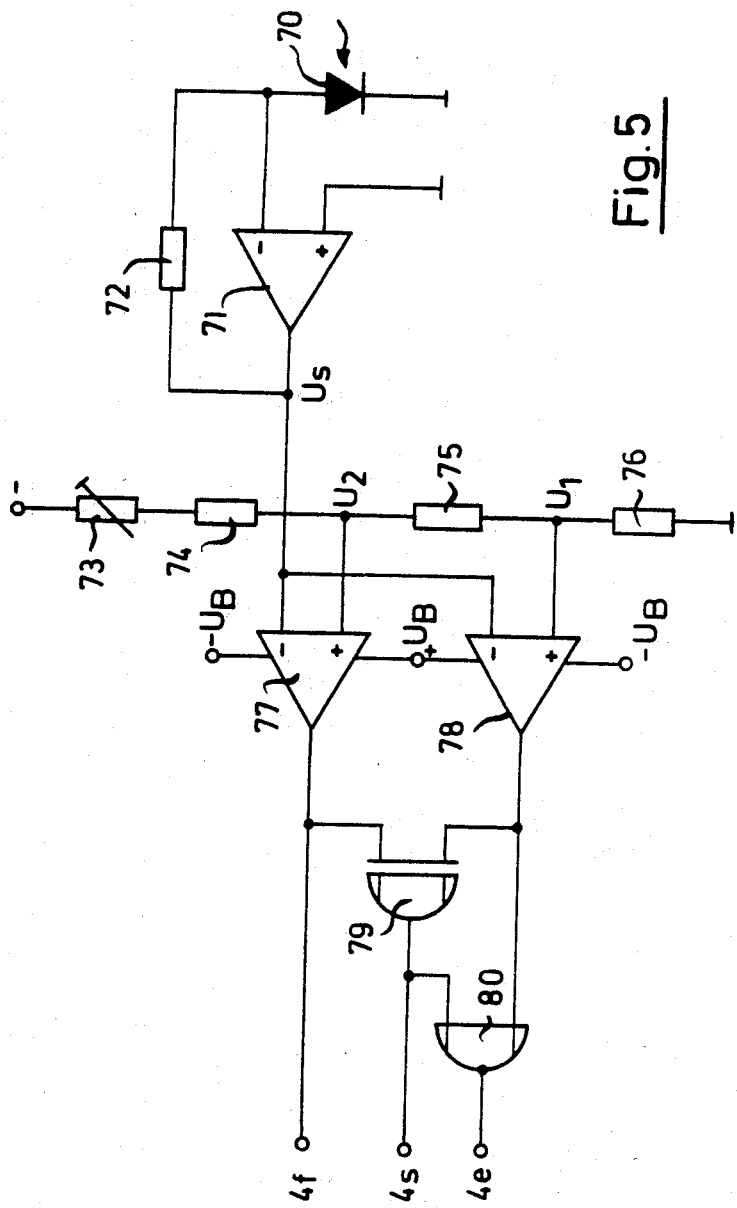
FIG. 5 is a diagram to show circuitry whereby an optical sensor may be used for automatic control of absorptance.

FIG. 5 shows a particularly advantageous extension of the invention, wherein radiation intensity behind the electrochromic layer is measured by an optical sensor 70 and coloring of the layer is so controlled that the same irradiation intensity is always present behind the layer. The optical sensor 70 may, for example, be a pin diode or a photo-transistor. If a pin diode, the output signal is first amplified by an operational amplifier 71 in conjunction with a resistor 72. Amplifier output is compared with the voltage then present at a voltage divider consisting of resistors 73 to 76, the desired range being determined by resistor 75 in comparison with the other resistors.

If $U_s$ is greater than $U_1$ and therefore the intensity of illumination is less than the desired range determined by the voltage divider, then a more positive voltage is present at the two inverting inputs of operational amplifiers 77 and 78 than at the non-inverting inputs. As a result, the outputs of both operational amplifiers 77 and 78 are at $-U_B$ and therefore at "L". An output $4f$, which replaces the start-coloring key, is therefore at "L". Another output $4s$ which replaces the stop key, and which is connected to amplifiers 77 and 78 via an EXOR gate 79, is also at "L". Finally, a third output $4e$, which replaces the start-decoloring key, is at "H", due to an interposed NOR gate 80; and this appearance of "H" at output $4f$ is operative to start a decoloring process.

If $U_s$ is less than $U_1$ but greater than $U_2$, signifying that the intensity of illumination is within the predetermiend desired limits, the output of operational amplifier 77 is at $-U_B$ and therefore at "L", while the output of operational amplifier 78 is at $+U_B$ and therefore at "H". Thus the "stop" output $4s$ changes to "H", and the outputs at $4f$ for "color-start" and at $4e$ for "decolor-start" become "L". The decoloring or coloring process is stopped, and the electrochromic layer remains in a condition of rest.

If $U_s$ is less than $U_2$, signifying that illumination intensity is greater than the predetermined desired limit, then the outputs of operational amplifiers 77 and 78 are at $+U_B$ and therefore at "H". Thus, the output $4f$ for "color-start" is at "H", the outputs $4s$ for "stop" and $4e$ for "decolor-start" are at "L", and the coloring process is started.

The desired limit of illumination intensity can be adjusted at variable resistor 73. Since the value of the desired range is also changed thereby, it is advisable for many purposes of use to change resistance at 75 when adjusting resistor 73 or to make resistor 75 independently adjustable. Limits of the coloring range are predetermined by counter 2 as in the case of the other embodiments.

The described method and arrangements can be employed to particular advantage, for instance, in the case of sunglasses. Known sunglasses of variable absorptance based on the use of phototropic lenses have the disadvantage that the change in absorptance proceeds too slowly and that such lenses function inadequately behind an automobile windshield. Electrochromic layers do not have these disadvantages. With the described circuit arrangements, it is possible with sunglasses having an electrochromic layer to continuously adjust the absorptance either manually or automatically via a brightness control. In the case of manual adjustment, any desired absorptance can be programmed in very simple fashion. The described arrangements are particularly advantageous in optically finished eyeglasses, so that normal eyeglasses can also be used as sunglasses. It is also possible, using different contact-electrode techniques, to color the eyeglass lenses more strongly in the upper region than in the lower regions and thus to produce so-called automobile driver's sunglasses, in which an instrument panel is more readily observed through the less colored part of the lenses.

Another field of use for the described arrangements consists of optical instruments in which a ray is to be weakened temporarily. Thus, for example, it is desirable in microscopes for the image to retain approximately the same brightness, for different degrees of magnification. For this purpose, a flat plane-parallel glass plate having an electrochromic layer is placed at a suitable point in the microscope ray path, and its absorptance is varied by one of the described arrangements. Thus, for example, the described control keys can be actuated via coupling to the magnification changer or to the lens turret. Automatic brightness control using an optical sensor as described in connection with FIG. 5 is particularly advantageous, especially in the case of microscopes having zoom magnification. In all cases, the electrochromic layer may also be applied on an existing optical component of the instrument.

A further field of use is provided by optical arrangements in which a required difference in reflectivity can be replaced by a difference in absorptivity, as for example, in the case of dimmable automobile rearview mirrors. Conventional mirrors of this type consist of a glass plate with a tiltable mirror disposed behind the plate; the mirror is swung away if observed incident light is too strong. This solution, however, has disadvantages: the mirror must be swung away by hand, which is possible with slight mechanical expense only for the case of inside mirrors, and automation or remote control is possible only at relatively high expense. On the other hand, with the present invention, a difference in reflectivity can also be obtained by a (stationary) glass plate having a mirror on its back surface and an electrochromic layer on its front surface. With the arrangements described in connection with FIGS. 1 to 4, a temporary dimming effect can be obtained by key actuation, a feature of particular advantage in the case of outside mirrors; however, key operation also has, in general, the advantage that the keys can be located completely independent of the mirror. With the feature described in connection with FIG. 5, the dimming or brightening is automatically effected, thus freeing the driver of the need to perform any actuations while driving.

What is claimed is:

1. Apparatus for continuously selective charge control of an electrochromic layer, said layer being uncolored for the case of no charge in said layer and being colored to a progressively increasing state of coloration for progressively increasing charges in said layer, said apparatus comprising: automatic means for limiting the charge deliverable to said layer to the extent of producing a predetermined fully-colored state of coloration and for limiting the charge removed from said layer to the extent of assuring a fully decolored state of coloration, whereby automatic limits are established for a predetermined range of colorability of said layer; selectively operable means for selecting a change of state of coloration of said layer within said range regardless of the currently existing state of coloration of the layer, said selectively operable means including a first key for effecting a more colored state of coloration and a second key for effecting a more decolored state of coloration, a constant-current charging circuit connected to charge said layer in the event of first-key actuation, and a constant-current charge-removal circuit connected to remove charge from said layer in the event of second-key actuation; said automatic means including clock-pulse generator means and an up/down counter, said counter being connected upon first-key actuation for up-counting during periods of first-key actuation, said counter being connected upon second-key actuation for down-counting during periods of second-key actuation, there being an up-counting limit at which first-key actuation is effectively disabled, there being a down-counting limit at which second-key actuation is effectively disabled, and the quantity of charge increment per unit up-count being preselected to be sufficiently greater than the quantity of charge-decrement per unit down-count such that the resulting unit down-counted decremental quantum removal of color slightly exceeds the unit up-counted incremental quantum darkening of color.

2. Apparatus according to claim 1, in which the constant current of said charging circuit is preset to a magnitude greater than the constant current of said charge-removal circuit.

3. Apparatus according to claim 1, in which (a) said first key comprises a first touch sensor to initiate a first-key operation, (b) said second key comprises a second touch sensor to initiate a second-key operation, and (c) a third touch sensor is operable to terminate a given key operation.

4. Apparatus according to claim 1, in which said first key comprises a first touch sensor to initiate a first-key operation and a second touch sensor to terminate first-key operation, and in which said second key comprises a third touch sensor to initiate a second-key operation and a fourth touch sensor to terminate second-key operation.

5. Apparatus according to claim 1, in which each of said constant-current circuits is provided by the emitter circuit of a transistor, and in which each transistor is connected by a base resistor to said automatic means.

6. Apparatus according to claim 1, in which a storage device and a comparator responsive to the instantaneous count by said counter are connected to disable key operation at any desired imtermediate count within said predetermined range of colorability.

7. Apparatus according to claim 1, in which said electrochromic layer is a sunglass element.

8. Apparatus according to claim 1, in which said electrochromic layer is an element of a dimmable mirror.

9. Apparatus according to claim 1, in which said electrochromic layer is an element of an optical filter.

10. Apparatus for continuously selective charge control of an electrochromic layer, said layer being uncolored for the case of no charge in said layer and being colored to a progressively increasing state of coloration for progressively increasing charges in said layer, said apparatus comprising: automatic means for limiting the charge deliverable to said layer to the extent of producing a predetermined fully colored state of coloration and for limiting the charge removed from said layer to the extent of assuring a fully decolored state of coloration, whereby automatic limits are established for a predetermined range of colorability of said layer, means including an optical sensor, for effecting a change of state of coloration of said layer within said range of colorability regardless of the currently existing state of coloration of the layer, said last-mentioned means including a comparator producing a first output signal for effecting a more colored state upon the output of said sensor exceeding a predetermined value, said comparator producing a second output signal for effecting a more decolored state upon the output of said sensor falling below said predetermined value, a constant-current charging circuit connected to said layer in the event of said first output signal, and a constant-current charge-removal circuit connected to remove charge from said layer in the event of said second signal; said automatic means including clock-pulse generator means and an up/down counter, said counter being connected in response to said first signal for up-counting during periods of first-signal duration, said counter being connected in response to said second signal for down-counting during periods of second-signal duration, there being an up-counting limit at which first-signal response is effectively disabled, there being a down-counting limit at which second-signal response is effectively disabled, and the quantity of charge increment per unit up-count being preselected to be sufficiently greater than the quantity of charge decrement per unit down-count such that the resulting unit down-counted decremental quantum removal of color slightly exceeds the unit up-counted incremental quantum darkening of color.

11. Apparatus according to claim 10, in which said electrochromic layer is an optical element in the path of light exposure to said optical sensor, whereby said electrochromic layer operates to maintain light exposure to said optical sensor at substantially the level established by said predetermined value at said comparator.

12. Apparatus according to claim 10, in which said electrochromic layer is a sunglass element.

13. Apparatus according to claim 10, in which said electrochromic layer is an element of a dimmable mirror.

14. Apparatus according to claim 10, in which said electrochromic layer is an element of an optical filter.

15. Apparatus for continuously selective charge control of an electrochromic layer, said layer being uncolored for the case of no charge in said layer and being colored to a progressively increasing state of coloration for progressively increasing charges in said layer, said apparatus comprising: automatic means for limiting the charge deliverable to said layer to the extent of producing a predetermined fully-colored state of coloration and for limiting the charge removed from said layer to the extent of assuring a fully decolored state of coloration, whereby automatic limits are established for a predetermined range of colorability of said layer; selectively operable means for selecting a change of state of coloration of said layer within said range regardless of the currently existing state of coloration of the layer, said selectively operable means including a first key for effecting a more colored state of coloration and a second key for effecting a more decolored state of coloration, a constant-current charging circuit connected to charge said layer in the event of first-key actuation, and a constant-current charge-removal circuit connected to remove charge from said layer in the event of second-key actuation; said automatic means including clock-pulse generator means and an up/down counter, said counter being connected upon first-key actuation for up-counting during periods of first-key actuation, said counter being connected upon second-key actuation for down-counting during periods of second-key actuation, there being an up-counting limit at which first-key actuation is effectively disabled, and there being a down-counting limit at which second-key actuation is effectively disabled.

16. Apparatus according to claim 13, in which said clock-pulse generator means comprises a first clock-pulse generator operated by said first key for up-counting and a second clock-pulse generator operated by said second key for down-counting, the pulse frequency of said first generator being greater than the pulse frequency of said second generator.

17. Apparatus according to claim 15, in which said clock-pulse generator means comprises a plurality of clock-pulse generators of different pulse frequency, the respective generators of said plurality being operated by said first key and dependent upon the instantaneous level of count by said counter.

18. Apparatus for continuously selective charge control of an electrochromic layer, said layer being uncolored for the case of no charge in said layer and being colored to a progressively increasing state of coloration for progressively increasing charges in said layer, said apparatus comprising: automatic means for limiting the charge deliverable to said layer to the extent of producing a predetermined fully colored state of coloration and for limiting the charge removed from said layer to the extent of assuring a fully decolored state of coloration, whereby automatic limits are established for a predetermined range of colorability of said layer; means including an optical sensor, for effecting a change of state of coloration of said layer within said range of colorability regardless of the currently existing state of coloration of the layer, said last-mentioned means including a comparator producing a first output signal for effecting a more colored state upon the output of said sensor exceeding a predetermined value; said comparator producing a second output signal for effecting a more decolored state upon the output of said sensor falling below said predetermined value, a constant-current charging circuit connected to charge said layer in the event of said first output signal, and a constant-current charge-removal circuit connected to remove charge from said layer in the event of said second signal; said automatic means including clock-pulse generator means and an up/down counter, said counter being connected in response to said first signal for up-counting during periods of first-signal duration, said counter being connected in response to said second signal for down-counting during periods of second-signal duration, there being an up-counting limit at which first-signal response is effectively disabled, and there being a down-counting limit at which second-signal response is effectively disabled.

19. Apparatus for continuously selective charge control of an electrochromic layer, said layer being uncolored for the case of no charge in said layer and being colored to a progressively increasing state of coloration for progressively increasing charges in said layer, said apparatus comprising: automatic means for limiting the charge deliverable to said layer to the extent of producing a predetermined fully-colored state of coloration and for limiting the charge removed from said layer to the extent of assuring a fully decolored state of coloration, whereby automatic limits are established for a predetermined range of colorability of said layer; selectively operable means for selecting a change of state of coloration of said layer within said range regardless of the currently existing state of coloration of the layer, said selectively operable means including a first key for effecting a more colored state of coloration and a second key for effecting a more decolored state of coloration, a constant-current charging circuit connected to charge said layer in the event of first-key actuation, and a constant-current charge-removal circuit connected to remove charge from said layer in the event of second-key actuation, the constant-current rates being substantially the same; said automatic means including clock-pulse generator means and an up/down counter, said counter being connected upon first-key actuation for up-counting during periods of first-key actuation, said counter being connected upon second-key actuation for down-counting during periods of second-key actuation, there being an up-counting limit at which first-key actuation is effectively disabled, there being a down-counting limit at which second-key actuation is effectively disabled, and said clock-pulse generator means comprising a first clock-pulse generator operated by said first key for up-counting and a second clock-pulse generator operated by said second key for down-counting, the pulse frequency of said first generator being preselected to be sufficiently greater than the pulse frequency of said second generator that the quantity of charge increment per unit up-count is less than the quantity of charge decrement per unit down-count, to the extent that the resulting unit down-counted decremental quantum removal of color slightly exceeds the unit up-counted incremental quantum darkening of color.

20. Apparatus for continuously selective charge control of an electrochromic layer, said layer being uncolored for the case of no charge in said layer and being colored to a progressively increasing state of coloration for progressively increasing charges in said layer, said apparatus comprising: automatic means for limiting the charge deliverable to said layer to the extent of producing a predetermined fully-colored state of coloration and for limiting the charge removed from said layer to the extent of assuring a fully decolored state of coloration, whereby automatic limits are established for a predetermined range of colorability of said layer; selectively operable means for selecting a change of state of coloration of said layer within said range regardless of the currently existing state of coloration of the layer, said selectively operable means including a first key for effecting a more colored state of coloration and a second key for effecting a more decolored state of coloration, a constant-current charging circuit connected to charge said layer in the event of first-key actuation, and a constant-current charge-removal circuit connected to remove charge from said layer in the event of second-key actuation; said automatic means including a single clock-pulse generator of a single clock-pulse frequency, and an up/down counter, said counter being connected upon first-key actuation for up-counting during periods of first-key actuation, said counter being connected upon second-key actuation for down-counting during periods of second-key actuation, there being an up-counting limit at which first-key actuation is effectively disabled, there being a down-counting limit at which second-key actuation is effectively disabled, and the charging current being so selected in excess of the charge-removal current that the quantity of charge increment per unit up-count is greater than the quantity of charge decrement per unit down-count, to the extent that the resulting unit down-counted decremental quantum removal of color slightly exceeds the unit up-counted incremental quantum darkening of color.

* * * * *